(12) United States Patent
Wang et al.

(10) Patent No.: US 10,748,258 B2
(45) Date of Patent: Aug. 18, 2020

(54) METHOD, DEVICE AND SYSTEM FOR CORRECTING DISTORTION OF WIDE-ANGLE LENS

(71) Applicant: JIANGXI LIANCHUANG ELECTRONIC CO., LTD., Nanchang (CN)

(72) Inventors: Zhuo Wang, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 164 days.

(21) Appl. No.: 16/195,284

(22) Filed: Nov. 19, 2018

(65) Prior Publication Data

US 2019/0236760 A1    Aug. 1, 2019

Related U.S. Application Data

(63) Continuation of application No. PCT/CN2018/081908, filed on Apr. 4, 2018.

(30) Foreign Application Priority Data

Feb. 1, 2018 (CN) .......................... 2018 1 0102392

(51) Int. Cl.
  *G06T 5/00*    (2006.01)
  *H04N 5/357*   (2011.01)
(52) U.S. Cl.
  CPC .......... *G06T 5/006* (2013.01); *H04N 5/3572* (2013.01)

(58) Field of Classification Search
None
See application file for complete search history.

(56) References Cited

U.S. PATENT DOCUMENTS

| 6,707,020 B1 | 3/2004 | Praus, II et al. |
| 2009/0237810 A1* | 9/2009 | Frazier ................... G02B 13/04 359/744 |

(Continued)

FOREIGN PATENT DOCUMENTS

| CN | 101572828 | 11/2009 |
| CN | 101582164 | 11/2009 |

(Continued)

*Primary Examiner* — Fayyaz Alam
(74) *Attorney, Agent, or Firm* — Hodgson Russ LLP

(57) ABSTRACT

The present disclosure provides a method, a device and a system for correcting distortion of a wide-angle lens. The method includes: acquiring n half field of views FOVs $\theta_1$ to $\theta_n$ of the wide-angle lens, and acquiring ratios of adjacent FOVs $\beta_1$ to $\beta_{(n-1)}$ according to the n half FOVs $\theta_1$ to $\theta_n$; obtaining image heights IHs $r_1$ to $r_n$ corresponding to the n half FOVs according to the n half FOVs $\theta_1$ to $\theta_n$; obtaining an IH relationship of adjacent half FOVs according to the ratios of adjacent FOVs $\beta_1$ to $\beta_{(n-1)}$ and the IHs $r_1$ to $r_n$ corresponding to the n half FOVs, and obtaining the IH of each half FOV through recurrence calculation according to an IH corresponding to a maximum FOV and the IH relationship of adjacent half FOVs; and correcting distortion of the wide-angle lens across FOVs according to the IH of each half FOV.

20 Claims, 4 Drawing Sheets

(56) References Cited

U.S. PATENT DOCUMENTS

2015/0213702 A1* 7/2015 Kimmel .................... G06T 7/20
                                                    382/103
2019/0121106 A1* 4/2019 Yang ................. G02B 27/0025
2019/0170984 A1* 6/2019 Lyu .......................... G02B 9/64
2019/0278044 A1* 9/2019 Zhang ................. H04N 5/2254

FOREIGN PATENT DOCUMENTS

| CN | 102156969 | 8/2011 |
| CN | 105827899 | 8/2016 |
| KR | 100871044 | 11/2008 |

* cited by examiner

METHOD, DEVICE AND SYSTEM FOR CORRECTING DISTORTION OF WIDE-ANGLE LENS

CROSS-REFERENCE TO RELATED APPLICATION

This application is a continuation of International Application No. PCT/CN2018/081908 filed Apr. 4, 2018, which claims priority to Chinese Patent Application Serial No. 201810102392.0, filed on Feb. 1, 2018. The entire disclosures of the aforementioned applications are incorporated herein by reference.

FIELD

The present disclosure relates to the field of image processing, and more particularly to, a method for correcting distortion of a wide-angle lens, a device for correcting distortion of a wide-angle lens, and a system for correcting distortion of a wide-angle lens.

BACKGROUND

ADAS (Advanced Driver Assistance System) is to use a variety of sensors installed on the vehicle to collect environmental data inside and outside the vehicle at the first time, and perform recognition, detection and tracking on static and dynamic objects, thereby allowing drivers to perceive possible danger in the fastest time, and effectively increasing comfort and safety of vehicle driving. Therefore, ADAS plays a very important role in implementation of automatic driving.

In the related art, a typical ADAS system generally provides three cameras at the front end of the vehicle, and the field of view angle is approximately 42°, 60° and 120°. If binocular vision is required, the number of cameras needs to be doubled. Each camera is equipped with a complementary metal oxide semiconductor (CMOS) sensor, e.g. 2 MP (i.e., 2 mega pixel) one.

However, there is a great deal of redundancy in the setting in the related art. For example, the field of view of a 42° camera is covered by fields of view of a 60° camera and a 120° camera, such that multiple cameras not only increase complexity of system connection and complexity of communication and synchronization between cameras, but also increase cost of the entire system, and cameras need to ensure predetermined overlaps of fields of view, a fixed angle relationship between each other is required, and the entire camera group and the vehicle also need to ensure angles. Therefore, it is required to performance not only the camera level calibration, but also boresight calibrations for each camera and periodically verify the validity of the calibrations, which remains an issue due to additional complexity and workload.

SUMMARY

Embodiments of an aspect of the present disclosure provide a method for designing and correcting distortion of a wide-angle lens. The method includes acquiring n half field of views (FOV) $\theta_1$ to $\theta_n$ of the wide-angle lens, in which $\theta_n$ and $\theta_{(n-1)}$ are adjacent half FOVs, and acquiring ratios of adjacent FOVs $\beta_1$ to $\beta_{(n-1)}$ according to the n half FOVs $\theta_1$ to $\theta_n$, where n is a positive integer greater than or equal to 2; obtaining image heights (IHs) $r_1$ to $r_n$ corresponding to the n half FOVs according to the n half FOVs $\theta_1$ to $\theta_n$; obtaining an IH relationship of adjacent half FOVs according to the ratios of adjacent FOVs $\beta_1$ to $\beta_{(n-1)}$ and the IHs $r_1$ to $r_n$ corresponding to the n half FOVs, and obtaining the IH of each half FOV through recurrence calculation according to an IH corresponding to a maximum FOV and the IH relationship of adjacent half FOVs; and correcting distortion of the wide-angle lens across FOVs according to the IH of each half FOV.

Embodiments of another aspect of the present disclosure provide a device for correcting distortion of a wide-angle lens. The device includes a processor and a memory. The memory is configured to store a computer program including instructions. The processor is configured to perform the method for correcting distortion of a wide-angle lens according to embodiments of the present disclosure.

Embodiments of another aspect of the present disclosure provide a system for correcting distortion of a wide-angle lens. The system includes a wide-angle lens corrected by the above device for correcting distortion of a wide-angle lens and a pixel sensor.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and readily appreciated from descriptions made with reference to following drawings, in which.

DETAILED DESCRIPTION

Figure 1:
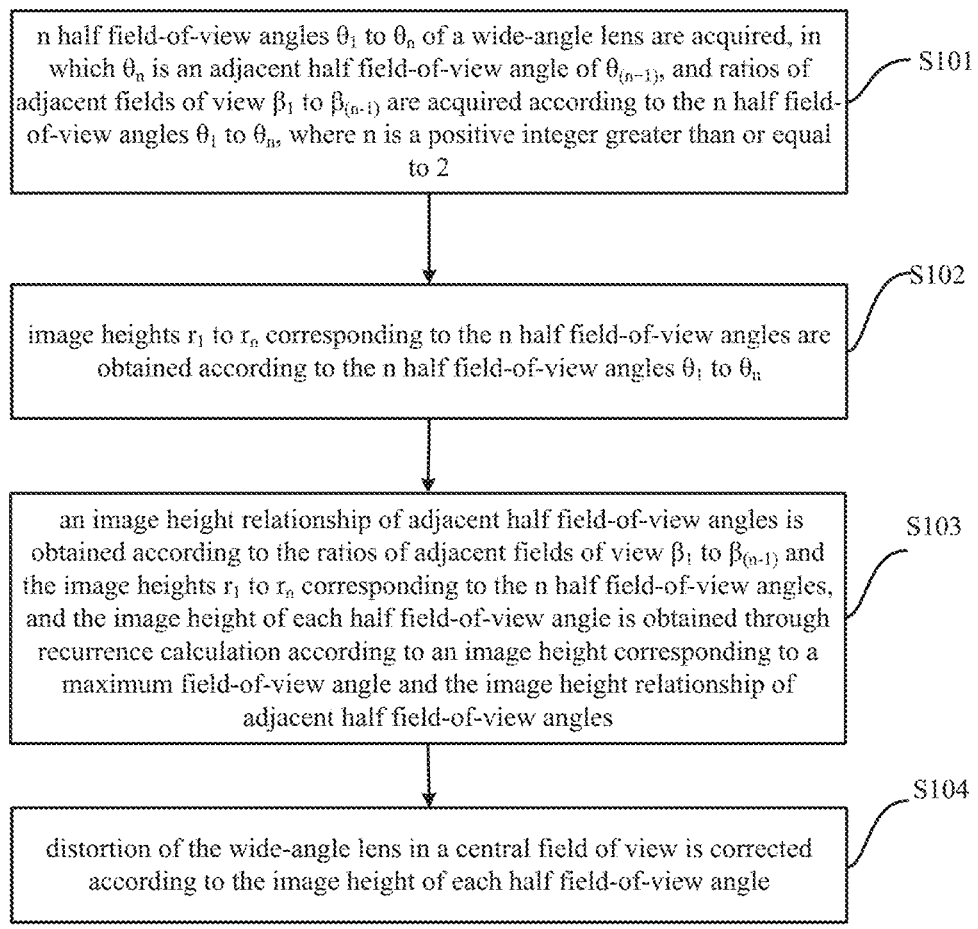
FIG. 1 is a flow chart of a method for correcting distortion of a wide-angle lens according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Before introducing the method, the device and the system for correcting distortion of a wide-angle lens according to embodiments of the present disclosure, methods for correcting distortion of wide-angle lenses in the related art are briefly introduced.

The size of the sensor with 2 MP pixels equipped for the ADAS system camera on market is about 1/2.7", and the number of pixels of next generation sensors is about 8 MP. Based on this, there is a need to design a camera which uses a high-pixel sensor camera to achieve effect of three sensor cameras in the related art. If it is simply based on sum of pixels, the number of pixels of the latest 8 MP sensor is greater than the sum of that of three 2 MP sensors. However, the 8 MP sensor can satisfy pixel requirement of a maximum FOV (field of view) of 120°, but may not satisfy pixel requirements of central FOVs of 60° and 42°.

In the related art, a typical imaging optical system may have problems that the sampling rate near the central FOV is low and the sampling rate of the edge is high, and illumination at the edge is decreased due to increase of the FOV. When the imaging system is corrected based on an ideal distortion curve (r=f*tan θ, θ is a half FOV), assuming that a relative IH (image height) of a 120° lateral FOV is 1, then a relative IH corresponding to a 60° total FOV at the center is tan(30°)/tan(60°)≈0.333, and a relative IH corresponding to a 42° total FOV at the center is tan(21°)/tan(60°)≈0.222. In this way, for an 8 MP image at 120°, it is only 0.9 MP after an area corresponding to 60° in the center is cropped, and it is dropped to 0.4 MP corresponding to the 42° total FOV at the center. Obviously, this ideal distortion correction method cannot realize initial requirements.

Similarly, when the system is corrected based on an ideal f-theta distortion correction (r=f*θ, θ is a half FOV) method, then a relative IH corresponding to a 60° total FOV is (30°)/(60°)=0.5, and a relative IH corresponding to a 42° total FOV at the center is (21°)/(60°)=0.35. Thus, for an 8 MP image at 120°, it is 2 MP after an area corresponding to 60° in the center is cropped, and it is 1MP after an area corresponding to 42° in the center is cropped. Obviously, the f-theta distortion correction method cannot realize initial requirements.

In summary, the main problem of the ideal distortion correction method and the f-theta distortion correction method in the related art is that the sampling rate of the edge is high. For f-tan(θ) distortion correction, the sampling rate of the edge is much greater than that of the central FOV, i.e., the edge was too much resolved. For the f-theta distortion correction, the sampling rate of the edge is the same as that of the central FOV, i.e., the edge and the central FOV are equally resolved.

In observation of the aforementioned issues, the present disclosure provides a method and a device for design and correcting distortion of a wide-angle lens.

In the following, a method, a device and a system for correcting distortion of a wide-angle lens according to embodiments of the present disclosure will be described below with reference to the drawings, and the method for correcting distortion of a wide-angle lens according to embodiments of the present disclosure will be described first.

FIG. 1 is a flow chart of a method for correcting distortion of a wide-angle lens according to an embodiment of the present disclosure.

As illustrated in FIG. 1, the method for correcting distortion of a wide-angle lens may include followings.

At block S101, n half FOVs $\theta_1$ to $\theta_n$ of a wide-angle lens are acquired, in which $\theta_n$ is an adjacent half FOV of $\theta_{(n-1)}$, and ratios of adjacent FOVs $\beta_1$ to $\beta_{(n-1)}$ are acquired according to the n half FOVs $\theta_1$ to $\theta_n$, where n is a positive integer greater than or equal to 2.

Furthermore, in an embodiment of the present disclosure, acquiring n half FOVs $\theta_1$ to $\theta_n$ of the wide-angle lens includes acquiring the maximum FOV of the wide-angle lens; and obtaining the half FOV $\theta_1$ according to the maximum FOV, and obtaining the half FOV $\theta_n$ according to the adjacent half FOV $\theta_{(n-1)}$.

Alternatively, in an embodiment of the present disclosure, the maximum full FOV is greater than or equal to 70°.

Alternatively, in an embodiment of the present disclosure, the maximum full FOV is greater than or equal to 100° and less than or equal to 200°.

It may be understood that, the wide-angle lens (which also known as the short focus lens) is a lens with a FOV greater than 60°. For a zoom lens on a camera, the wide-angle lens is the portion with a focal length less than 25 mm. By using the wide-angle lens, it is facilitated to present large range scenes at close range, and the wide-angle lens is suitable for displaying the main body of the picture and its environment. By using characteristics of depth of field of the wide-angle lens, the object can be displayed at multiple levels, and capacity and information amount of the picture can be increased. By using the wide-angle lens to capture objects at close range, quick shooting and steal shooting can be implemented, and moreover, it is conducive to maintaining a smooth picture of a mobile camera.

It can be understood that, in embodiments of the present disclosure, a maximum HFOV (Horizontal Field Of View) of the wide-angle lens can be acquired first, and n adjacent half FOVs of the wide-angle lens can be selected. For example, the adjacent half FOVs $\theta_1$, $\theta_2$, . . . $\theta_n$ of the wide-angle lens can be selected in turn, where $\theta_1$=HFOV/2, n>=2, $\theta_1 > \theta_2 > \theta_3 > $ . . . $ > \theta_n$. It should be noted that, the maximum FOV of the wide-angle lens may be greater than or equal to 70°, and alternatively, the maximum FOV of the wide-angle lens is greater than or equal to 100° and less than or equal to 200°. It should be noted that, the FOV refers to the horizontal FOV.

At block S102, IHs $r_1$ to $r_n$ corresponding to the n half FOVs are obtained according to the n half FOVs $\theta_1$ to $\theta_n$.

At block S103, an IH relationship of adjacent half FOVs is obtained according to the ratios of adjacent FOVs $\beta_1$ to $\beta_{(n-1)}$ and the IHs $r_1$ to $r_n$ corresponding to the n half FOVs, and the IH of each half FOV is obtained through recurrence calculation according to an IH corresponding to a maximum FOV and the IH relationship of adjacent half FOVs.

Furthermore, in an embodiment of the present disclosure, obtaining the IH relationship of the adjacent half FOVs according to the ratios of adjacent half FOVs $\beta_1$ to $\beta_{(n-1)}$ and the IHs $r_1$ to $r_n$ corresponding to the n half FOVs includes: performing sampling process on the IHs $r_1$ to $r_n$ corresponding to the n half FOVs through a FOV relationship, in which the sampling process adopts an interpolation method; and obtaining the IH relationship of the adjacent half FOVs according to the FOV relationship.

In an embodiment of the present disclosure, the IH relationship of adjacent half FOVs is denoted as:

$$\frac{r_n}{r_{(n-1)}} = \frac{1}{2 - \frac{1}{\beta_{(n-1)}}},$$

The IH of each half FOV obtained though the recurrence calculation according to the IH of the maximum FOV and the IH relationship of the adjacent half FOVs is denoted as:

$$r_n = \frac{1}{2-\frac{1}{\beta_1}} \times \frac{1}{2-\frac{1}{\beta_2}} \cdots \frac{1}{2-\frac{1}{\beta_{(n-1)}}} \times r_1,$$

where $r_{(n-1)}$ is the IH corresponding to the half FOV $\theta_{(n-1)}$, $r_n$ is the IH corresponding to the half FOV $\theta_n$, $\beta_1$ is the ratio of $\theta_1$ to $\theta_2$, $\beta_2$ is the ratio of $\theta_2$ to $\theta_3$, $\beta_{(n-1)}$ is the ratio of $\theta_{(n-1)}$ to $\theta_n$.

Figure 2:
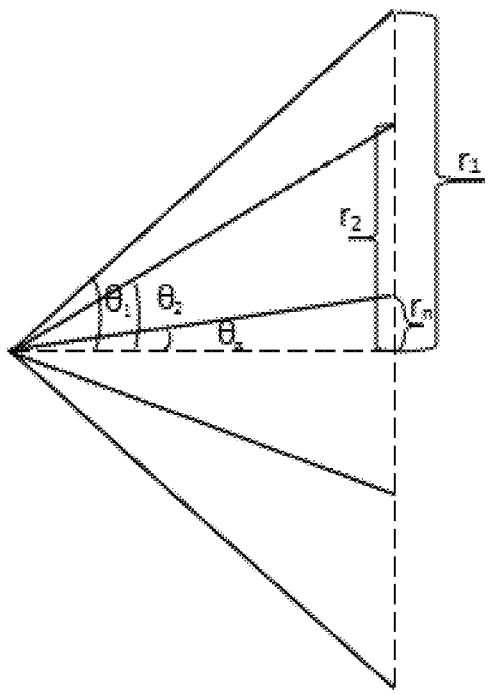
FIG. 2 is a schematic diagram of an IH relationship of a wide-angle lens at adjacent FOVs according to an embodiment of the present disclosure.

It can be understood that, in embodiments of the present disclosure, the n adjacent half FOVs $\theta_1, \theta_2, \ldots, \theta_n$ of the wide-angle lens can be selected in turn, and IHs $r_1, r_2, \ldots r_n$ corresponding to respective half FOVs of the n half FOVs $\theta_1, \theta_2, \ldots \theta_n$ can be defined, where $\theta_1 = HFOV/2$, $n \geq 3$, $\theta_1 > \theta_2 > \theta_3 > \ldots > \theta_n$. A schematic diagram of an IH relationship of adjacent half FOVs is illustrated in FIG. 2.

In addition, in embodiments of the present disclosure, ratios of adjacent FOVs may be defined as:

$\beta_1 = \theta_1/\theta_2, \beta_2 = \theta_2/\theta_3, \ldots, \beta_{(n-1)} = \theta_n$ Therefore, sampling process can be performed on the IHs of the n half FOVs through interpolation according to the ratios of the adjacent FOVs to obtain the relationship. The sampling process on the IHs of the n half FOVs of the wide-angle lens may be implemented by following relationship expressions (1) to (3).

$$\frac{r_2}{\beta_1} + (r_1 - r_2) = r_2, \quad (1)$$

$$\frac{r_3}{\beta_2} + (r_2 - r_3) = r_3, \quad (2)$$

$$\frac{r_n}{\beta_{(n-1)}} + (r_{(n-1)} - r_n) = r_n, \quad (3)$$

where, $r_1$ is the IH corresponding to the half FOV $\theta_1$, $r_2$ is the IH corresponding to the half FOV $\theta_2$, $r_3$ is the IH corresponding to the half FOV $\theta_3$, $r_{(n-1)}$ is the IH corresponding to the half FOV $\theta_{(n-1)}$, $r_n$ is the IH corresponding to the half FOV $\theta_n$, $\beta_1$ is the ratio of $\theta_1$ to $\theta_2$, $\beta_2$ is the ratio of $\theta_2$ to $\theta_3$, $\beta_{(n-1)}$ is the ratio of $\theta_{(n-1)}$ to $\theta_n$, and n is an integer greater than or equal to 2.

It should be noted that, the relationship expression (3) means that, the IH $r_n$ corresponding to the high-resolution small FOV $\theta_n$ at the center can be down sampled at the adjacent large FOV $\theta_{(n-1)}$, and the ratio of the linear down sampling is $\beta_{(n-1)}$, the newly introduced IH $(r_{(n-1)} - r_n)$ of the large FOV does not require re-sampling under ideal conditions, i.e., the pixel resolution will not be wasted, the result is that the large FOV $\theta_{(n-1)}$ achieves a pixel resolution that is the same as the adjacent small FOV $\theta_n$, i.e., the IH of the large FOV is $r_n$ after down sampling.

In addition, in embodiments of the present disclosure, the above relationship expressions (1) to (3) may be optimized, to obtain following IH relationships (4) to (6) of adjacent half FOVs.

$$\frac{r_2}{r_1} = \frac{1}{2-\frac{1}{\beta_1}}, \quad (4)$$

$$\frac{r_3}{r_2} = \frac{1}{2-\frac{1}{\beta_2}}, \quad (5)$$

$$\frac{r_n}{r_{(n-1)}} = \frac{1}{2-\frac{1}{\beta_{(n-1)}}}, \quad (6)$$

In other words, since it is known that the IH corresponding to the maximum half FOV of the wide-angle lens is $r_1$, in embodiments of the present disclosure, the IH relationship can be calculated by recurrence:

$$r_n = \frac{1}{2-\frac{1}{\beta_1}} \times \frac{1}{2-\frac{1}{\beta_2}} \cdots \frac{1}{2-\frac{1}{\beta_{(n-1)}}} \times r_1. \quad (7)$$

At block S104, distortion of the wide-angle lens across FOVs is corrected according to the IH of each half FOV.

It should be noted that, in the actual design process of the lens, the actual IH of each half FOV can be obtained according to the IH of each half FOV, in other words, according to design requirements, the actual IH of each half FOV may be as close as possible to the IH of each half FOV calculated by theory. The relationship between the actual IH $r'_n$ corresponding to the half FOV $\theta_n$ and the IH $r_n$ corresponding to the half FOV $\theta_n$ can be denoted as:

$(1-10\%)r_n \leq r'_n \leq (1+10\%)r_n.$

It can be understood that, in the design process of the lens, since the actual IH of each half FOV may be as close as possible to the IH of each half FOV calculated by theory, in embodiments of the present disclosure, the distortion of the wide-angle lens in the central FOV can be sequentially corrected according to the IH of each half FOV.

For example, in an embodiment of the present disclosure, the wide-angle lens system adopting recursive distortion correction (preferably an optical system including an 8 MP CMOS sensor or higher and a wide-angle lens with a maximum 1200 FOV with specifically designed distortion curve as discussed below) can be implemented to effectively replace a system having three lenses (FOVs of which are 120°, 60° and 42° respectively) and three 2 MP sensors. In other words, it can realize that the entire FOV of the wide-angle lens is 120°, the corresponding resolution is 8 MP, and it can also realize the small FOV of 60° and 42° in the center and the corresponding 2 MP resolution in the center, the specific steps of which are as follows.

First, in an embodiment of the present disclosure, a half of the maximum 120° FOV of the wide-angle lens $\theta_1$ is 60°, and the corresponding IH is $r_1$, a half of the adjacent medium 60° FOV is 30°, and the corresponding IH is $r_2$, a half of the small 42° FOV in the center is 21°, and the corresponding IH is $r_3$, ratios of adjacent FOVs can be obtained by:

$\beta_1 = \theta_1/\theta_2 = 60/30 = 2, \beta_2 = \theta_2/\theta_3 = 30/21 = 10/7;$ Then, in embodiments of the present disclosure, sampling process can be performed on IHs corresponding to the half FOVs $\theta_2$ and $\theta_3$ by following relationships:

$$\frac{r_2}{\beta_1} + (r_1 - r_2) = r_2, \quad (8)$$

-continued $$\frac{r_3}{\beta_2} + (r_2 - r_3) = r_3, \quad (9)$$

The above relationships may be further optimized, to obtain IH relationships between adjacent half FOVs as:

$$\frac{r_2}{r_1} = \frac{1}{2 - \frac{1}{\beta_2}}, \quad (10)$$

$$\frac{r_3}{r_2} = \frac{1}{2 - \frac{1}{\beta_2}}, \quad (11)$$

Since the IH corresponding to the maximum FOV of the wide-angle lens is $r_1$, the IH relationship can be calculated through recurrence by:

$$r_2 = \frac{1}{2 - \frac{1}{\beta_2}} \times r_1 = \frac{2}{3} r_1, \quad (12)$$

$$r_3 = \frac{1}{2 - \frac{1}{\beta_1}} \times \frac{1}{2 - \frac{1}{\beta_2}} \times r_1 = \frac{20}{39} r_1, \quad (13)$$

Thus, distortion correction can be performed on the wide-angle lens according to the obtained IH of each half FOV.

According to the relationship expressions (12) and (13), it is assumed that the IH $r_1$ corresponding to the 120° FOV is 1, and then the normalized IH $r_2 = \frac{2}{3} \approx r_1 \approx 0.6667$ corresponding to the adjacent 60° FOV. When the IH corresponding to the 42° FOV at the center is calculated, in embodiments of the present disclosure, a recurrence algorithm may be adopted, and the corresponding normalized IH $r_1 = 10/13 \cdot \frac{2}{3} \cdot r_1 = 20/39 \approx 0.5128$.

It can be understood that, in the embodiment, the actual IH $r'_2$ of the 60° FOV can be as close as possible to the normalized IH $r_2$ corresponding to the 60° FOV calculated by theory, and the actual IH $r'_3$ of the 42° FOV can be as close as possible to the normalized IH $r_3$ corresponding to the 42° FOV calculated by theory, so as to meet actual design requirements of the lens. In detail, $(1-10\%)r_2 \leq r'_2 \leq (1+10\%)r_2$, $(1-10\%)r_3 \leq r'_3 \leq (1+10\%)r_3$. Then, the distortion of the wide-angle lens in the central FOV can be corrected according to the actual IH $r'_2$ and $r'_3$ of each half FOV.

In addition, beneficial effects brought by the recursive distortion correction method provided in embodiments of the present disclosure and ordinary distortion correction methods in the related art are shown in Table 1. Since distortion requirement is proposed based on nonlinear sampling of the system, it is not based on preferences of human eyes, and is entirely for machine vision. Moreover, in embodiments of the present disclosure, the sampling is implemented by interpolation, and interpolation points are nonlinearly distributed, thus the interpolation position can be calculated in advance, so as to increase the speed. Table 1 is a comparison table of IHs of recursive distortion control according to embodiments of the present disclosure to those of distortion control in the related art.

TABLE 1

| distortion correction method | | | |
|---|---|---|---|
| | $\theta_3 = 42/2 = 21°$ | $\theta_2 = 60/2 = 30°$ | $\theta_1 = 120/2 = 60°$ |
| recursive distortion control | 0.5128 | 0.6667 | 1 |
| f-theta distortion control (r = f * θ) | 0.35 | 0.5 | 1 |
| Rectilinear (r = f * tanθ) | 0.2216 | 0.3333 | 1 |
| Stereographic (r = 2f * tan(θ/2)) | 0.3217 | 0.4640 | 1 |

In embodiments of the present disclosure, a 8 MP CMOS sensor and a wide-angle lens with a maximum 120° FOV are adopted, when the IH relationship is converted to a pixel relationship (for example, 8 MP AR0820 of ON Semiconductor Company has 3840*2160 pixels, then the half FOV has 1920*1080 pixels), a correspondence between pixels of recursive distortion control according to embodiments of the present disclosure and those of distortion control in the related art can be obtained, as shown in Table 2. Table 2 is a comparison table of horizontal pixels of recursive distortion control according to embodiments of the present disclosure to those of distortion control in the related art.

TABLE 2

| distortion correction method | | | |
|---|---|---|---|
| | $\theta_3 = 42/2 = 21°$ | $\theta_2 = 60/2 = 30°$ | $\theta_1 = 120/2 = 60°$ |
| recursive distortion control | 985 | 1280 | 1920 |
| f-theta distortion control (r = f * θ) | 672 | 960 | 1920 |
| Rectilinear (r = f * tanθ) | 425 | 640 | 1920 |
| Stereographic (r = 2f * tan(θ/2)) | 618 | 891 | 1920 |

It can be seen from Table 1 and Table 2 that, the recursive distortion correction control adopted in embodiments of the present disclosure can ensure that central part of the wide-angle lens achieves a 2 MP resolution after interception. In detail, it can be seen from Table 2 that, when only information inside the central part of the 21° half FOV is cropped, the corresponding number of pixels is 985, which is basically the same as the number of pixels of 2 MP AR0231 of ON Semiconductor Company (964=1928/2). In other words, the information amount of pixels included in this part is consistent with that in a case where a lens is separately designed and AR0231 is provided.

Furthermore, for the 30° half FOV, after the central 20° is down sampled, the included pixels are also 985 (985*7/10+ 1280−985=985). Similarly, in the case of the 60° FOV, the effective pixel resolution is also 985 after the 30° FOV is down sampled.

In summary, with the wide-angle lens adopting non-linear recursive distortion correction provided by embodiments of the present disclosure, the resolution corresponding to the 120° FOV is 8 MP, the small 42° FOV at the center is cropped, and 2 MP resolution at the center can be achieved. By performing down sampling on the central 42° FOV, the 2 MP resolution can be implemented based on information of the 60° FOV. Furthermore, by performing down sampling on the 60° FOV, the 2 MP resolution of the total FOV can be implemented based on the information between 60° and 120°. Therefore, embodiments of the present disclosure may replace the system having multiple sensors with low pixels and multiple lenses with a sensor with higher pixels and a wide-angle lens which has been corrected using the recursive distortion correction.

Since the sampling rate at the center is high, a denoising algorithm, for example, binning of central pixels, can be introduced during the down sampling process, to solve problems of increase of dark noise due to decrease of the pixel size. For example, when it is two times down sampling, a 2×2 matrix kernel convolution may be performed for the central part before sampling.

A typical application scenario is that, when the light is sufficient in the daytime, the resolution in the central part (such as 42° FOV) is sufficient, and signal strength is sufficient, the ADAS system can see far away. At night, light is insufficient, due to limited illumination of vehicle lights and street lights, although the 42° camera can look far, the obtained picture has much noise and illumination is insufficient, in this case, down sampling can be performed on the 60° FOV to remove some noise. Although the resolution of the central part within 42° is sacrificed, low-light sensitivity of the system is improved. Since the driving speed at night may be low, it is also acceptable that the resolution of the object to be recognized is low. Furthermore, when the illumination is lower and visibility is worse, based on the condition of the 120° FOV, denoising and down sampling may be simultaneously performed on the central 60° and 42°.

In other words, in embodiments of the present disclosure, a 8 MP CMOS chip can be used, and three 2 MP images (which correspond to 42° FOV, 60° FOV and 120° FOV, respectively) are generated. When the light is sufficient, the ADAS system may be served by the 42° FOV and the 120° FOV. In this case, the 42° FOV can ensure that the ADAS system can see far. When the light is slightly weak, the 60° FOV and the 120° FOV may be depended on. When the light is very weak, the 2 MP image generated by the 120° FOV may be depended on. In this case, for the 8 MP sensor chip, the pixel size is 2.1 um, the effect of which is equivalent to perform 2×2 binning on the sensor, and the effective pixel size is 4.2 um, which is consistent with an AR0220 chip having good performance in low light.

Compared with the distortion correction control method in the related art, the method for correcting distortion of a wide-angle lens provided in embodiments of the present disclosure may have following beneficial effects: (1) in embodiments of the present disclosure, distortion of the wide-angle lens can effectively be corrected, and it is realized that the sampling rate of the center FOV is greater than that of the edge, such that the resolution of the central FOV of the wide-angle lens can be adjusted quantitatively with the need of the system; (2) since a large degree of information is compressed to a smaller area of the central FOV, the relative illumination value of the lens system can be even greater than 1, such that chief ray angle (CRA) can be increased in the optical design, thereby reducing a total length of the system, enabling the entire system more compact.

By taking Table 2 as an example, in actual optical lens design, several key points can be added to control of distortion. IHs at 1920 pixels and 985 pixels need to be controlled, and distortion points at 1280 pixels can be added, so as to ensure smooth transition of the distortion curve at these three points.

It is emphasized here that, there is no need to strictly control distortion at 1280 pixels, for it is close to the central FOV, that is, the distance between the 21° half FOV and the 30° half FOV is very short, effective control of chief ray may be challenging. In other words, even if the 30° FOV cannot be effectively controlled, and the direct result is that the size of the obtained picture is greater than 2 MP (such as 3 MP) when the 30° FOV is sampled, the situation can easily be corrected by the subsequent digital processing. Another compromise that can be considered is to control the 30° half FOV strictly. However, it is difficult to perform distortion correction for the 21° half FOV itself, and the result is that the picture cut out for the 21° FOV is not 2 MP. The selection of specific solutions requires those skilled in the art to make decisions based on actual conditions. However, distortion at 60° is a key to implementing this algorithm, where distortion needs to be effectively controlled.

For example, in embodiments of the present disclosure, the distortion of the wide-angle lens may be corrected based on following steps.

At step 1, according to optical lens design requirements, several FOVs can be selected, such as 42°, 60°, and 120°.

At step 2, a distortion curve (i.e., a theoretical distortion curve) is generated according to the relationship between the FOV and the IH obtained based on the method of the present disclosure.

At step 3, the lens can be designed to make the actual distortion curve satisfy the theoretical distortion curve as much as possible according to the obtained theoretical distortion curve. It should be noted that, since the theoretical distortion curve has only three control points (i.e., 42°, 60°, and 120°), the part between the three points can be obtained according to actual design results.

At step 4, the relationship between the FOV and the actual IH can be obtained according to the actual distortion curve of the lens, i.e., the actual IH corresponding to each FOV is as close as possible to the theoretically calculated IH. Then, the wide-angle lens can be designed according to the relationship between the FOV and the actual IH. In this case, the actual distortion curve is a continuous curve, rather than just a few control points.

At step 5, according to the relationship between the FOV and the actual IH, difference sampling is performed on the obtained image by the CMOS sensor, to obtain an undistorted graph of the central FOV, including graphs of the 42° FOV, the 60° FOV, and the 120° FOV.

It should be noted that, when the initial FOV is not specified properly, for example, the small 42° FOV is actually selected as 20°, the theoretically calculated distortion curve may be difficult to implement in the actual design, for there is a possible iterative process, in other words, in the optical design, it is necessary to re-select the FOV when found that the selected angle is difficult to implement.

According to the method for correcting distortion of a wide-angle lens according to embodiments of the present disclosure, the IH relationship of adjacent half FOVs can be obtained according to ratios of adjacent FOVs and IHs corresponding to multiple half FOVs, and the IH of each half FOV can be obtained through recurrence calculation according to the IH corresponding to the maximum FOV and the IH relationship of adjacent half FOVs, such that distortion of the wide-angle lens in the central FOV is corrected according to the IH of each half FOV, which can realize that a sampling rate of the central FOV of the wide-angle lens is greater than that of the edge, the resolution of the central FOV of the wide-angle lens can be adjusted quantitatively with the need of the system, and the entire system can be more compact by increasing the CRA to reduce the total length of the system. By using a camera with high pixels to replace multiple cameras with low pixels, cost of the ADAS system can be saved, requirements for system correction and system calculation can be simplified, accuracy and reliability of the system can be improved, correction efficiency can be improved, cost can be effectively reduced, and it is easy to implement.

The device for correcting distortion of a wide-angle lens according to embodiments of the present disclosure will be described.

Figure 3:
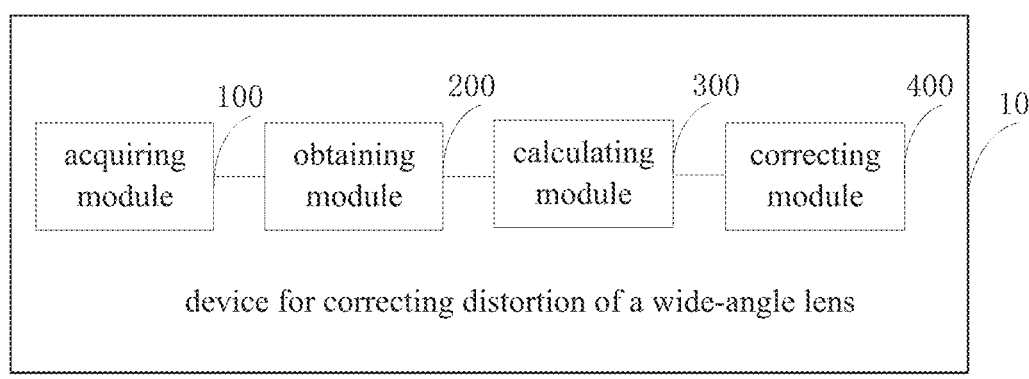
FIG. 3 is a block diagram of a device for correcting distortion of a wide-angle lens according to an embodiment of the present disclosure.

FIG. 3 is a block diagram of a device for correcting distortion of a wide-angle lens according to an embodiment of the present disclosure.

As illustrated in FIG. 3, the device 10 for correcting distortion of a wide-angle lens may include an acquiring module 100, an obtaining module 200, a calculating module 300 and a correcting module 400.

The acquiring module 100 is configured to acquire n half FOVs $\theta_1$ to $\theta_n$ of the wide-angle lens, in which $\theta_n$ is an adjacent half FOV of $\theta_{(n-1)}$, and acquire ratios of adjacent FOVs $\beta_1$ to $\beta_{(n-1)}$ according to the n half FOVs $\theta_1$ to $\theta_n$, where n is a positive integer greater than or equal to 2. The obtaining module 200 is configured to obtain IHs $r_1$ to $r_n$ corresponding to the n half FOVs according to the n half FOVs $\theta_1$ to $\theta_n$. The calculating module 300 is configured to obtain an IH relationship of adjacent half FOVs according to the ratios of adjacent FOVs $\beta_1$ to $\beta_{(n-1)}$ and the IHs $r_1$ to $r_n$ corresponding to the n half FOVs, and obtain the IH of each half FOV through recurrence calculation according to an IH of a maximum FOV and the IH relationship of the adjacent half FOVs. The correcting module 400 is configured to correct distortion of the wide-angle lens across FOVs according to the IH of each half FOV.

Furthermore, in an embodiment of the present disclosure, the acquiring module 100 includes an acquiring unit and a selecting unit. The acquiring unit is configured to acquire the maximum FOV of the wide-angle lens. The selecting unit is configured to obtain the half FOV $\theta_1$ according to the maximum FOV, and obtain the half FOV $\theta_n$ according to the adjacent half FOV $\theta_{(n-1)}$.

Furthermore, in an embodiment of the present disclosure, the calculating module 300 includes a processing unit and a calculating unit. The processing unit is configured to perform sampling process on the IHs $r_1$ to $r_n$ corresponding to the n half FOVs through a FOV relationship, in which the sampling process adopts an interpolation method. The obtaining unit is configured to obtain the IH relationship of the adjacent half FOVs according to the FOV relationship.

Furthermore, in an embodiment of the present disclosure, the IH relationship of the adjacent half FOVs is denoted as:

$$\frac{r_n}{r_{(n-1)}} = \frac{1}{2 - \frac{1}{\beta_{(n-1)}}},$$

The IH of each half FOV obtained though the recurrence calculation according to the IH of the maximum FOV and the IH relationship of the adjacent half FOVs is denoted as:

$$r_n = \frac{1}{2 - \frac{1}{\beta_1}} \times \frac{1}{2 - \frac{1}{\beta_2}} \cdots \frac{1}{2 - \frac{1}{\beta_{(n-1)}}} \times r_1,$$

where $r_{(n-1)}$ is the IH corresponding to the half FOV $\theta_{(n-1)}$, $r_n$ is the IH corresponding to the half FOV $\theta_n$, $\beta_1$ is the ratio of $\theta_1$ to $\theta_2$, $\beta_2$ is the ratio of $\theta_2$ to $\theta_3$, $\beta_{(n-1)}$ is the ratio of $\theta_{(n-1)}$ to $\theta_n$.

Furthermore, in an embodiment of the present disclosure, the correcting module 400 is further configured to obtain an actual IH of each half FOV according to the IH of each half FOV; and correct the distortion of the wide-angle lens across FOVs according to the actual IH of each half FOV. The relationship between the actual IH $r'_n$ corresponding to the half FOV $\theta_n$ and the IH $r_n$ corresponding to the half FOV $\theta_n$ is denoted as:

$(1-10\%)r_n \leq r'_n \leq (1+10\%)r_n.$

Furthermore, in an embodiment of the present disclosure, the maximum full FOV is greater than or equal to 70°.

Furthermore, in an embodiment of the present disclosure, the maximum full FOV is greater than or equal to 100° and less than or equal to 200°.

It should be noted that, the foregoing explanation and description in embodiments of the method for correcting distortion of a wide-angle lens may also suitable for embodiments of the system for correcting distortion of a wide-angle lens, which will not be described in detail herein.

With the device for correcting distortion of a wide-angle lens according to embodiments of the present disclosure, the IH relationship of adjacent half FOVs can be obtained according to ratios of adjacent FOVs and IHs corresponding to multiple half FOVs, and the IH of each half FOV can be obtained through recurrence calculation according to the IH corresponding to the maximum FOV and the IH relationship of adjacent half FOVs, such that distortion of the wide-angle lens in the central FOV is corrected according to the IH of each half FOV, which can realize that a sampling rate of the central FOV of the wide-angle lens is greater than that of the edge, the resolution of the central FOV of the wide-angle lens can be adjusted quantitatively with the need of the system, and the entire system can be more compact by increasing the CRA to reduce the total length of the system.

In addition, embodiments of the present disclosure further provide a guideline on how to design the distortion curve for a wide-angle lens. The system includes a wide-angle lens corrected by the above device for correcting distortion of a wide-angle lens and a pixel sensor.

Furthermore, in an embodiment of the present disclosure, the wide-angle lens corrected by the above device for correcting distortion of a wide-angle lens may include a first lens, a second lens, a third lens, a diaphragm, a fourth lens, a fifth lens, a sixth lens, a seventh lens and a filter in turn from an object side to an image side.

Furthermore, in an embodiment of the present disclosure, the first lens, the second lens and the seventh lens are aspheric shape lenses.

Furthermore, in an embodiment of the present disclosure, each aspheric surface of the first lens, the second lens and the seventh lens meets a following formula:

$$z = \frac{ch^2}{1 + \sqrt{1 - (1+K)c^2h^2}} + Bh^4 + Ch^6 + Dh^8 + Eh^{10},$$

where z is a curvature corresponding to a radius, h is a radial coordinate, c is a curvature of the vertex of the surface, K is a conic quadratic curve coefficient, and B, C, D and E represent coefficients corresponding to radial coordinates of a fourth order, a sixth order, an eighth order, and a tenth order, respectively.

Figure 4:
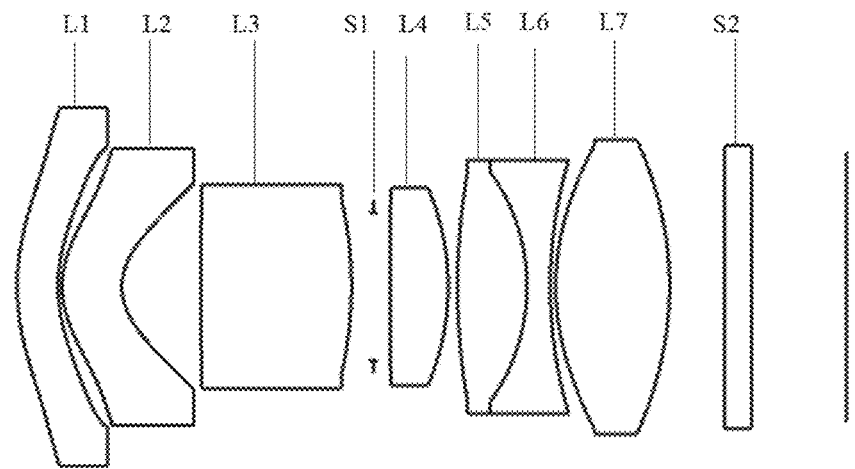
FIG. 4 is a schematic diagram of a wide-angle lens adopting recursive distortion correction according to an embodiment of the present disclosure.

It can be understood that, as illustrated in FIG. 4, the wide-angle lens adopting recursive distortion correction according to embodiments of the present disclosure includes a first lens L1, a second lens L2, a third lens L3, an aperture stop S1, a fourth lens L4, a fifth lens L5, a sixth lens L6, a seventh lens L7 and a filter S2 in turn from an object side to an image side, and the first lens L1, the second lens L2 and the seventh lens L7 are aspheric shape lenses. Design parameters of each lens in the wide-angle lens of embodiments of the present disclosure are shown in Table 3, and aspheric parameters of each lens are shown in Table 4.

TABLE 5

|  | $\theta_3 = 42/2 = 21°$ | $\theta_2 = 60/2 = 30°$ | $\theta_1 = 120/2 = 60°$ |
| --- | --- | --- | --- |
| IH controlled by recursive distortion correction | 0.51 | 0.67 | 1.00 |
| actual design IH (mm) | 2.00 | 2.65 | 4.03 |

TABLE 3

| Surface No. |  | Surface type | Curvature radius | Thickness | Refractive index | Abbe number |
| --- | --- | --- | --- | --- | --- | --- |
| object side | object side | spherical | infinity | infinity |  |  |
| 1 | first lens | aspheric | 6.896161 | 1.229576 | 1.851348 | 40.104483 |
| 2 |  | aspheric | 4.521516 | 0.1241612 |  |  |
| 3 | second lens | aspheric | 2.732199 | 1.800003 | 1.592014 | 67.022703 |
| 4 |  | aspheric | 1.694803 | 2.379077 |  |  |
| 5 | third lens | spherical | 165.1311 | 4.549425 | 1.701545 | 41.140848 |
| 6 |  | spherical | −11.65568 | 0.660381 |  |  |
| 7 | aperture stop | spherical | infinity | 0.4966793 |  |  |
| 8 | fourth lens | spherical | 144.8521 | 1.754088 | 1.592807 | 68.525033 |
| 9 |  | spherical | −7.554906 | 0.284424 |  |  |
| 10 | fifth lens | spherical | 20.25022 | 2.086968 | 1.592807 | 68.525033 |
| 11 | sixth lens | spherical | −5.955785 | 0.6999899 | 1.672702 | 32.183894 |
| 12 |  | spherical | 13.41471 | 0.1655521 |  |  |
| 13 | seventh lens | aspheric | 7.447449 | 3.44482 | 1.497103 | 81.559580 |
| 14 |  | aspheric | −10.18011 | 1.655624 |  |  |
| 15 | filter | spherical | infinity | 0.8 |  | 1.516797 |
| 16 |  | spherical | infinity | 2.870331 |  |  |
| image side | imaging plane | spherical | infinity | — |  |  |

TABLE 4

| Surface No. | K | B | C | D | E |
| --- | --- | --- | --- | --- | --- |
| 1 | 0 | −3.8374314E−04 | −1.5055908E−04 | 6.1232632E−06 | −8.0617855E−08 |
| 2 | 0 | −4.958842E−03 | 3.7624731E−05 | 0 | −4.1913319E−08 |
| 3 | 0 | −7.5354197E−03 | 7.0516528E−05 | 1.779984E−06 | 4.9338394E−08 |
| 4 | 0 | −5.4503468E−03 | −1.3410263E−03 | 1.3650908E−04 | −4.7678347E−06 |
| 13 | 0 | 1.3069027E−04 | 1.2776526E−05 | −7.5482317E−07 | 6.6789675E−09 |
| 14 | 0 | −3.3369975E−04 | 3.5188772E−05 | −1.0964844E−06 | 2.2856114E−09 |

Figure 5:
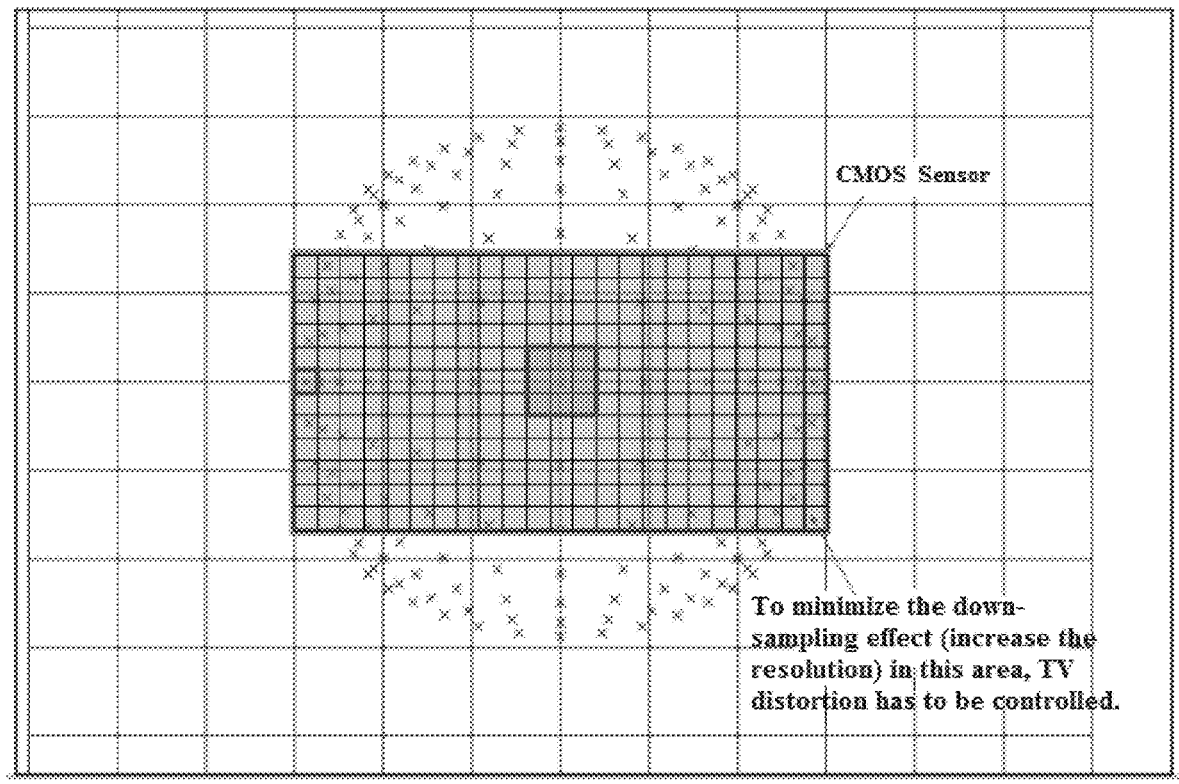
FIG. 5 is a schematic diagram of a grid diagram of a system for correcting distortion of a wide-angle lens before down sampling according to an embodiment of the present disclosure.
Figure 6:
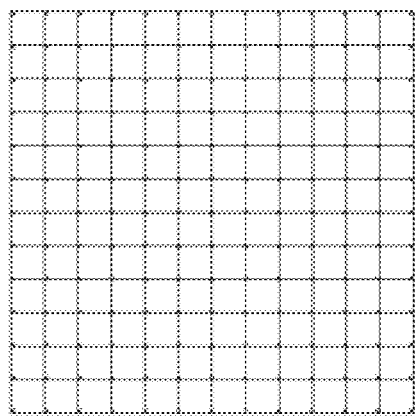
FIG. 6 is a schematic diagram of a grid diagram of a system for correcting distortion of a wide-angle lens after down sampling according to an embodiment of the present disclosure.

Furthermore, as illustrated in FIG. 5, a small "x" represents a uniform sampling of the chief ray on the FOV. After it is projected onto the CMOS sensor, distortion occurs, and the result is that the central part is not greatly distorted. A small "x" may correspond to a sampling of about 9 pixels, the resolution is high, and a small "x" on the edge corresponds to a sampling of a pixel, the resolution is low. A black square in FIG. 5 represents a pixel. After down sampling, the small "x" may be evenly distributed, and the reconstructed image is illustrated in FIG. 6. The frequency of re-sampling can be calculated as $((30/21)*(60/30))^2 = 8.2$. Therefore, the wide-angle lens provided by embodiments of the present disclosure achieves distortion correction after re-sampling.

Table 5 shows the IH and pixel parameters of the wide-angle lens provided in the embodiment at different half FOV angles. It can be seen from Table 5, the wide-angle lens of embodiments of the present disclosure have values basically the same as theoretical values of the recursive distortion correction method of the present disclosure, which indicates that the recursive distortion correction method of embodiments of the present disclosure can effectively correct distortion of the wide-angle lens in the central FOV, and can realize that the sampling rate of the central FOV is greater than that of the edge.

TABLE 5-continued

|  | $\theta_3 = 42/2 = 21°$ | $\theta_2 = 60/2 = 30°$ | $\theta_1 = 120/2 = 60°$ |
| --- | --- | --- | --- |
| normalization of actual design IH | 0.50 | 0.66 | 1.00 |
| horizontal pixels (Pixels) | 1904.8 | 2523.8 | 3838.1 |
| pixels of FOVs (Pixels) | 2,040,816 | 3,582,908 | 8,286,173 |

For example, in another embodiment of the present disclosure, the wide-angle lens which has been corrected using the recursive distortion correction is adopted, and it is assumed that a system using a 160° wide-angle lens and a 12.4 MP CMOS sensor is adopted. When the resolution of the central 42° FOV is still 2 MP, then according to Table 6, the sensor needs 4802*2702 pixels, i.e., 12.4 MP after the horizontal FOV is increased to 160°. In addition, when the horizontal FOV is maintained at 120°, after the sensor is increased to 12 MP, the number of pixels of the central 42° FOV is also increased to 3 MP. Therefore, the next generation wide-angle lenses may have two development directions, one is to improve coverage of the FOV and maintain central resolution, the other is to maintain coverage of the FOV and improve central resolution. It should be noted that, embodiments of the present disclosure may determine a suitable solution according to the development and algorithm of the ADAS.

TABLE 6

| | different distortion control (projection solution) | | | |
|---|---|---|---|---|
| | HFOV/ 2 = 21 | HFOV/ 2 = 30 | HFOV/ 2 = 60 | HFOV/ 2 = 80 |
| IH controlled by recursive distortion correction | 0.4102 | 0.5334 | 0.8 | 1 |
| f-theta distortion control (r = f * θ) | 0.2625 | 0.3750 | 0.75 | 1 |
| Rectilinear (r = f * tanθ) | 0.0677 | 0.1018 | 0.3054 | 1 |
| Stereographic(r = 2f * tanθ/2) | 0.2209 | 0.3193 | 0.6881 | 1 |

It can be seen from table 6 that, when the HFOV reaches 160°, when it is required to ensure overlap of 2 MP of central 42°, pixels of the entire sensor is 4802*2702 (i.e., 12.4 MP).

It should be noted that, the foregoing explanation and description in embodiments of the method for correcting distortion of a wide-angle lens may also suitable for embodiments of the system for correcting distortion of a wide-angle lens, which will not be described in detail herein.

According to the system for correcting distortion of a wide-angle lens according to embodiments of the present disclosure, the IH relationship of adjacent half FOVs can be obtained according to ratios of adjacent FOVs and IHs corresponding to multiple half FOVs, and the IH of each half FOV can be obtained through recurrence calculation according to the IH corresponding to the maximum FOV and the IH relationship of adjacent half FOVs, such that distortion of the wide-angle lens in the central FOV is corrected according to the IH of each half FOV, which can realize that a sampling rate of the central FOV of the wide-angle lens is greater than that of the edge, the resolution of the central FOV of the wide-angle lens can be adjusted quantitatively with the need of the system, and the entire system can be more compact by increasing the CRA to reduce the total length of the system. By using a camera with high pixels to replace multiple cameras with low pixels, cost of the ADAS system can be saved, requirements for system correction and system calculation can be simplified, accuracy and reliability of the system can be improved, correction efficiency can be improved, cost can be effectively reduced, and it is easy to implement.

In the description of the present disclosure, it should be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although explanatory embodiments have been shown and described, it would be appreciated that the above embodiments cannot be construed to limit the present disclosure, and changes, alternatives, and modifications can be made in the embodiments without departing from spirit, principles and scope of the present disclosure.

What is claimed is:

1. A method for correcting distortion of a wide-angle lens, comprising:
   acquiring n half field of views FOVs $\theta_1$ to $\theta_n$ of the wide-angle lens, wherein $\theta_n$ is an adjacent half FOV of $\theta_{(n-1)}$, and acquiring ratios of adjacent FOVs $\beta_1$ to $\beta_{(n-1)}$ according to the n half FOVs $\theta_1$ to $\theta_n$, where n is a positive integer greater than or equal to 2;
   obtaining image heights IHs $r_1$ to $r_n$ corresponding to the n half FOVs according to the n half FOVs $\theta_1$ to $\theta_n$;
   obtaining an IH relationship of adjacent half FOVs according to the ratios of adjacent FOVs $\beta_1$ to $\beta_{(n-1)}$ and the IHs $r_1$ to $r_n$ corresponding to the n half FOVs, and obtaining the IH of each half FOV through recurrence calculation according to an IH corresponding to a maximum FOV and the IH relationship of adjacent half FOVs; and
   correcting distortion of the wide-angle lens across FOVs according to the IH of each half FOV.

2. The method according to claim 1, wherein acquiring n half FOVs $\theta_1$ to $\theta_n$ of the wide-angle lens comprises:
acquiring the maximum FOV of the wide-angle lens; and
obtaining the half FOV $\theta_1$ according to the maximum FOV, and obtaining the half FOV $\theta_n$ according to the adjacent half FOV $\theta_{(n-1)}$.

3. The method according to claim 1, wherein obtaining the IH relationship of the adjacent half FOVs according to the ratios of adjacent half FOVs $\beta_1$ to $\beta_{(n-1)}$ and the IHs $r_1$ to $r_n$ corresponding to the n half FOVs comprises:
performing sampling process on the IHs $r_1$ to $r_n$ corresponding to the n half FOVs through a FOV relationship, wherein the sampling process adopts an interpolation method; and
obtaining the IH relationship of the adjacent half FOVs according to the FOV relationship.

4. The method according to claim 3, wherein the IH relationship of the adjacent half FOVs is denoted as:

$$\frac{r_n}{r_{(n-1)}} = \frac{1}{2 - \frac{1}{\beta_{(n-1)}}},$$

and the IH of each half FOV obtained though the recurrence calculation according to the IH of the maximum FOV and the IH relationship of the adjacent half FOVs is denoted as:

$$r_n = \frac{1}{2 - \frac{1}{\beta_1}} \times \frac{1}{2 - \frac{1}{\beta_2}} \cdots \frac{1}{2 - \frac{1}{\beta_{(n-1)}}} \times r_1,$$

where $r_{(n-1)}$ is the IH corresponding to the half FOV $\theta_{(n-1)}$, $r_n$ is the IH corresponding to the half FOV $\theta_n$, $\beta_1$ is the ratio of $\theta_1$ to $\theta_2$, $\beta_2$ is the ratio of $\theta_2$ to $\theta_3$, $\beta_{(n-1)}$ is the ratio of $\theta_{(n-1)}$ to $\theta_n$.

5. The method according to claim 4, wherein correcting the distortion of the wide-angle lens across FOVs according to the IH of each half FOV comprises:
obtaining an actual IH of each half FOV according to the IH of each half FOV; and
correcting the distortion of the wide-angle lens across FOVs according to the actual IH of each half FOV, wherein a relationship between the actual IH $r'_n$ corresponding to the half FOV $\theta_n$ and the IH $r_n$ corresponding to the half FOV $\theta_n$ is denoted as:

$(1-10\%)r_n \leq r'_n \leq (1+10\%)r_n.$

6. The method according to claim 2, wherein the maximum FOV is greater than or equal to 70°.

7. The method according to claim 6, wherein the maximum FOV is greater than or equal to 100° and less than or equal to 200°.

8. A device for correcting distortion of a wide-angle lens, comprising: a processor; and a memory, configured to store a computer program comprising instructions; wherein the processor is configured to: acquire n half FOVs $\theta_1$ to $\theta_n$ of the wide-angle lens, wherein $\theta_n$ is an adjacent half FOV of $\theta_{(n-1)}$, and acquire ratios of adjacent FOVs $\beta_1$ to $\beta_{(n-1)}$ according to the n half FOVs $\theta_1$ to $\theta_n$, wherein n is a positive integer greater than or equal to 2; obtain image heights IHs $r_1$ to $r_n$ corresponding to the n half FOVs according to the n half FOVs $\theta_1$ to $\theta_n$; obtain an IH relationship of adjacent half FOVs according to the ratios of adjacent FOVs $\beta_1$ to $\beta_{(n-1)}$ and the IHs $r_1$ to $r_n$ corresponding to the n half FOVs, and obtain the IH of each half FOV through recurrence calculation according to an IH of a maximum FOV and the IH relationship of the adjacent half FOVs; and correct distortion of the wide-angle lens across FOVs according to the IH of each half FOV.

9. The device according to claim 8, wherein when acquiring n half FOVs $\theta_1$ to $\theta_n$ of the wide-angle lens, the processor is configured to:
acquire the maximum FOV of the wide-angle lens; and
obtain the half FOV $\theta_1$ according to the maximum FOV, and obtain the half FOV $\theta_n$ according to the adjacent half FOV $\theta_{(n-1)}$.

10. The device according to claim 8, wherein when obtaining the IH relationship of the adjacent half FOVs according to the ratios of adjacent half FOVs $\beta_1$ to $\beta_{(n-1)}$ and the IHs $r_1$ to $r_n$ corresponding to the n half FOVs, the processor is configured to:
perform sampling process on the IHs $r_1$ to $r_n$ corresponding to the n half FOVs through a FOV relationship, wherein the sampling process adopts an interpolation method; and
obtain the IH relationship of the adjacent half FOVs according to the FOV relationship.

11. The device according to claim 10, wherein the IH relationship of the adjacent half FOVs is denoted as:

$$\frac{r_n}{r_{(n-1)}} = \frac{1}{2 - \frac{1}{\beta_{(n-1)}}},$$

and the IH of each half FOV obtained though the recurrence calculation according to the IH of the maximum FOV and the IH relationship of the adjacent half FOVs is denoted as:

$$r_n = \frac{1}{2 - \frac{1}{\beta_1}} \times \frac{1}{2 - \frac{1}{\beta_2}} \cdots \frac{1}{2 - \frac{1}{\beta_{(n-1)}}} \times r_1,$$

wherein $r_{(n-1)}$ is the IH corresponding to the half FOV $\theta_{(n-1)}$, $r_n$ is the IH corresponding to the half FOV $\theta_n$, $\beta_1$ is the ratio of $\theta_1$ to $\theta_2$, $\beta_2$ is the ratio of $\theta_2$ to $\theta_3$, $\beta_{(n-1)}$ is the ratio of $\theta_{(n-1)}$ to $\theta_n$.

12. The device according to claim 11, wherein when correcting the distortion of the wide-angle lens across FOVs according to the IH of each half FOV, the processor is configured to:
obtain an actual IH of each half FOV according to the IH of each half FOV; and
correct the distortion of the wide-angle lens across FOVs according to the actual IH of each half FOV, wherein a relationship between the actual IH $r'_n$ corresponding to the half FOV $\theta_n$ and the IH $r_n$ corresponding to the half FOV $\theta_n$ is denoted as:

$(1-10\%)r_n \leq r'_n \leq (1+10\%)r_n.$

13. The device according to claim 9, wherein the maximum FOV is greater than or equal to 70°.

14. The device according to claim 13, wherein the maximum FOV is greater than or equal to 100° and less than or equal to 200°.

15. A system for correcting distortion of a wide-angle lens, comprising: a wide-angle lens corrected by a device for correcting distortion of a wide-angle lens; and a pixel sensor; wherein the device for correcting distortion of a wide-angle lens comprises a processor and a memory configured to store a computer program comprising instructions, and the processor is configured to: acquire n half FOVs $\theta_1$ to $\theta_n$ of the wide-angle lens, wherein $\theta_n$ is an adjacent half FOV of $\theta_{(n-1)}$, and acquire ratios of adjacent FOVs $\beta_1$ to $\beta_{(n-1)}$ according to then half FOVs $\theta_1$ to $\theta_n$, wherein n is a positive integer greater than or equal to 2; obtain image heights IHs $r_1$ to $r_n$ corresponding to the n half FOVs according to the n half FOVs $\theta_1$ to $\theta_n$; obtain an IH relationship of adjacent half FOVs according to the ratios of adjacent FOVs $\beta_1$ to $\beta_{(n-1)}$ and the IHs $r_1$ to $r_n$ corresponding to the n half FOVs, and obtain the IH of each half FOV through recurrence calculation according to an IH of a maximum FOV and the IH relationship of the adjacent half FOVs; and correct distortion of the wide-angle lens across FOVs according to the IH of each half FOV.

16. The system according to claim 15, wherein when acquiring n half FOVs $\theta_1$ to $\theta_n$ of the wide-angle lens, the processor is configured to:
acquire the maximum FOV of the wide-angle lens;
obtain the half FOV $\theta_1$ according to the maximum FOV, and obtain the half FOV $\theta_n$ according to the adjacent half FOV $\theta_{(n-1)}$.

17. The system according to claim 15, wherein when obtaining the IH relationship of the adjacent half FOVs according to the ratios of adjacent half FOVs $\beta_1$ to $\beta_{(n-1)}$ and the IHs $r_1$ to $r_n$ corresponding to the n half FOVs, the processor is configured to:
perform sampling process on the IHs $r_1$ to $r_n$ corresponding to the n half FOVs through a FOV relationship, wherein the sampling process adopts an interpolation method; and
obtain the IH relationship of the adjacent half FOVs according to the FOV relationship.

18. The system according to claim 17, wherein the IH relationship of the adjacent half FOVs is denoted as:

$$\frac{r_n}{r_{(n-1)}} = \frac{1}{2 - \frac{1}{\beta_{(n-1)}}},$$

and the IH of each half FOV obtained though the recurrence calculation according to the IH of the maximum FOV and the IH relationship of the adjacent half FOVs is denoted as:

$$r_n = \frac{1}{2 - \frac{1}{\beta_1}} \times \frac{1}{2 - \frac{1}{\beta_2}} \cdots \frac{1}{2 - \frac{1}{\beta_{(n-1)}}} \times r_1,$$

wherein $r_{(n-1)}$ is the IH corresponding to the half FOV $\theta_{(n-1)}$, $r_n$ is the IH corresponding to the half FOV $\theta_n$, $\beta_1$ is the ratio of $\theta_1$ to $\theta_2$, $\beta_2$ is the ratio of $\theta_2$ to $\theta_3$, $\beta_{(n-1)}$ is the ratio of $\theta_{(n-1)}$ to $\theta_n$.

19. The system according to claim 18, wherein when correcting the distortion of the wide-angle lens across FOVs according to the IH of each half FOV, the processor is configured to:
obtain an actual IH of each half FOV according to the IH of each half FOV; and
correct the distortion of the wide-angle lens across FOVs according to the actual IH of each half FOV, wherein a relationship between the actual IH $r'_n$ corresponding to the half FOV $\theta_n$ and the IH $r_n$ corresponding to the half FOV $\theta_n$ is denoted as:

$(1-10\%)r_n \leq r'_n \leq (1+10\%)r_n.$

20. The system according to claim 16, wherein the maximum FOV is greater than or equal to 70°.

* * * * *